(12) United States Patent
Cataldo et al.

(10) Patent No.: US 8,843,841 B2
(45) Date of Patent: Sep. 23, 2014

(54) SYSTEM AND METHOD FOR INTERACTIVE INSTRUMENT OPERATION AND AUTOMATION

(75) Inventors: James Adam Cataldo, Saratoga, CA (US); Long Bill Huynh, Daly City, CA (US); Stanley T. Jefferson, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 852 days.

(21) Appl. No.: 12/432,959

(22) Filed: Apr. 30, 2009

(65) Prior Publication Data

US 2010/0281412 A1   Nov. 4, 2010

(51) Int. Cl.
*G06F 3/048* (2013.01)
*G06F 9/455* (2006.01)
*G06F 3/0484* (2013.01)
*G06F 3/0482* (2013.01)

(52) U.S. Cl.
CPC ........ *G06F 9/45512* (2013.01); *G06F 3/04842* (2013.01); *G06F 3/0484* (2013.01); *G06F 3/0482* (2013.01)
USPC .......................................... 715/771; 715/772

(58) Field of Classification Search
CPC .. G06F 3/0482; G06F 3/0484; G06F 3/04842
USPC .................................................. 715/771, 772
See application file for complete search history.

(56) References Cited

U.S. PATENT DOCUMENTS

| | | | | |
|---|---|---|---|---|
| 6,405,145 | B1* | 6/2002 | Rust et al. | 702/91 |
| 6,697,754 | B1* | 2/2004 | Alexander | 702/119 |
| 7,134,081 | B2* | 11/2006 | Fuller, III | 715/735 |
| 7,340,737 | B2* | 3/2008 | Ghercioiu et al. | 717/171 |
| 7,356,046 | B2* | 4/2008 | Harley, Jr. | 370/466 |
| 7,984,423 | B2* | 7/2011 | Kodosky et al. | 717/113 |
| 2005/0232302 | A1 | 10/2005 | Tillotson et al. | |
| 2005/0235292 | A1* | 10/2005 | Tillotson et al. | 719/328 |
| 2006/0235979 | A1* | 10/2006 | Bizet et al. | 709/227 |

* cited by examiner

*Primary Examiner* — David Phantana Angkool

(57) ABSTRACT

A system and method: provide a user interface to a user, the user interface including one or more objects representing a corresponding one or more instruments that are connected to the system; receive from a user a selection of one of the one or more instruments, made via the user interface; obtaining at the computer a file that describes commands to which the selected instrument responds; and present to the user via the user interface an indication of the commands to which the selected instrument responds.

18 Claims, 6 Drawing Sheets

SYSTEM AND METHOD FOR INTERACTIVE INSTRUMENT OPERATION AND AUTOMATION

BACKGROUND

Measurement and test instruments are commonly employed for testing and determining performance characteristics of electronic devices systems. Initially, such instruments were stand-alone units designed for rather limited and specific applications. Within the instrument industry, a wide variety of instrument command sets were developed which required instrument users, and test program developers, to learn a new vocabulary for each instrument. Furthermore, programming an instrument is very different than operating it from the front panel. Most instrument users find it hard to figure out how to program their instrument to automate measurements using low-level commands and drivers. Part of the problem is that users often don't understand how commands interact without trying them out. This proliferation of command sets has resulted in users spending a great deal of time learning how to program instruments, made maintenance of test programs difficult, and made it difficult to upgrade test systems as new equipment became available.

In order to reduce development costs, various standard electrical and mechanical interfaces were developed for instruments and other electronic devices. With the advent of computer communication and computer control of instruments and systems of instruments, standardized signal protocols and other standardized electrical and mechanical interfaces became more prevalent. These protocols were mainly intended to set standards for digital messages sent over these interfaces.

The Standard Commands for Programmable Instrumentation (SCPI) protocol standard was developed to define a set of commands for controlling programmable test and measurement devices in instrumentation systems. An instrumentation system is a collection of test and measurement devices connected by a communication bus to a control computer called the system controller. An instrumentation system may include stand-alone devices like IEEE 488 instruments or instrument cards in an enclosure such as a VXIbus rack.

Client processes often located on remote computers may send commands (for example, a command to apply a signal, to make a measurement, to perform a calibration, or the like) to one or more instruments over an instrument bus. These commands are called program messages. Instruments may also send response messages back to the clients. The response messages may be measurement results, instrument settings, error messages, or the like. Prior to the SCPI standard, the commands that controlled a particular device function varied between instruments which had similar capabilities. SCPI provides a uniform and consistent language for the control of test and measurement instruments. The same commands and responses can control corresponding instrument functions in SCPI equipment, regardless of the supplier or the type of instrument.

For instance, the command to measure a frequency is the same using the SCPI standard, whether the measurement is made by an oscilloscope, spectrum analyzer, or a counter. The set of commands to control multi-meters from two manufacturers differs only in places where the underlying hardware has different capabilities. Thus, instruments from different vendors can be expected to be essentially interchangeable in many applications.

SCPI provides a means to perform simple operations. The MEAS (measure) command, for example, can configure and read data from an instrument. When the program message ":MEAS:VOLT:AC?" is received by a voltmeter, for example, the meter will select settings and configure its circuitry for an AC voltage measurement, initiate the measurement, and return the result to the system controller. The question mark at the end of the command instructs the voltmeter to return the measured value to the controller. As another example, the SCPI command ":MEAS:FREQ?" returns a frequency measurement from an oscilloscope, spectrum analyzer, or a counter, despite great internal differences in the hardware of the instruments.

SCPI commands are organized in hierarchical structures referred to as trees. In the above two commands, "MEAS" is a parent node in a SCPI tree while "VOLT" is one child node of that parent and "FREQ" is another child node of that parent.

A central feature of the SCPI standard is the Command Reference which is a list of definitions for all the program messages. These definitions specify precisely the syntax and semantics for every SCPI message. Instrument functions covered by the standard may only be controlled through SCPI commands. However, SCPI was designed with a modular structure that permits commands controlling new functions to be added at any time.

The Hewlett-Packard Interface Bus (HPIB) interface system, also known as the General-Purpose Interface Bus (GPIB) or by its Institute of Electrical and Electronic Engineers (IEEE) specification number IEEE 488, is a scheme by which groups of devices may be connected to a controlling computer and communicate under its direction. Instruments from multiple vendors can be operated in the same HPIB system. SCPI commands can be implemented on an instrument using any sort of interface, as for example, HPIB, serial/RS-232, VXI backplane, or the like, but they are especially common on HPIB busses.

The IEEE 488.1 standard defines hardware for an instrumentation bus. It is a digital bus with lines for the serial transfer of data bytes, plus extra control and handshaking lines. The IEEE 488.2 is an additional standard that defines protocols for data/command exchange between controller and instruments, basic data formats, systematic rules for program messages, and definition of instrument status structures. IEEE 488.2 also defines some common commands covering instrument functions that are universally applicable. However, IEEE 488.2 does not define commands or data structures for specific applications. Instrument makers are free to define the commands that control the primary functions of their instruments. SCPI builds upon IEEE 488.2 by standardizing these primary functions.

Accordingly, instrument driver routines and SCPI commands are the most common modes of remotely controlling instruments, for example to execute a test program.

However, programming instruments with either of these two technologies can be difficult. Instruments are complex, and the SCPI commands that can be used with each particular instrument depend upon the capabilities of the underlying hardware of the instrument, so it is difficult for a user to keep track of exactly which SCPI commands can be used with each particular instrument—especially when the user is programming a large number of different instruments. Also, it is often difficult to know which driver routine or SCPI command can perform a desired task, and users often don't understand how various commands interact without trying them out.

What is needed, therefore, is a tool to let users operate an instrument remotely without requiring them to know all of the commands and their associated characteristics before-hand.

SUMMARY

In an example embodiment, a method comprises: providing a user interface to a user via a display device and a user input device associated with a computer, the user interface including one or more objects representing a corresponding one or more instruments that are connected to the computer; receiving from a user a selection of one of the one or more instruments, the selection being made via the user interface; obtaining at the computer a file that describes commands to which the selected instrument responds; and presenting to the user via the user interface an indication of the commands to which the selected instrument responds.

In another example embodiment, a system comprises: a display device; a user input device; a communication port; and a processor configured to execute an algorithm. The algorithm comprises: displaying on the display device indications of one or more objects representing one or more corresponding instruments that are connected to the system via the communication port; receiving from the user input device a user-selection of one of the one or more instruments; obtaining at the computer a file that describes commands to which the selected instrument responds; and displaying on the display device an indication of the commands to which the selected instrument responds.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Unless otherwise noted, when a first device is said to be connected to a second device, this encompasses cases where one or more intermediate devices may be employed to connect the two devices to each other. However, when a first device is said to be directly connected to a second device, this encompasses only cases where the two devices are connected to each other without any intermediate or intervening devices. Similarly, when a signal is said to be coupled to a device, this encompasses cases where one or more intermediate devices may be employed to couple the signal to the device. However, when a signal is said to be directly coupled to a device, this encompasses only cases where the signal is directly coupled to the device without any intermediate or intervening devices.

Figure 1:
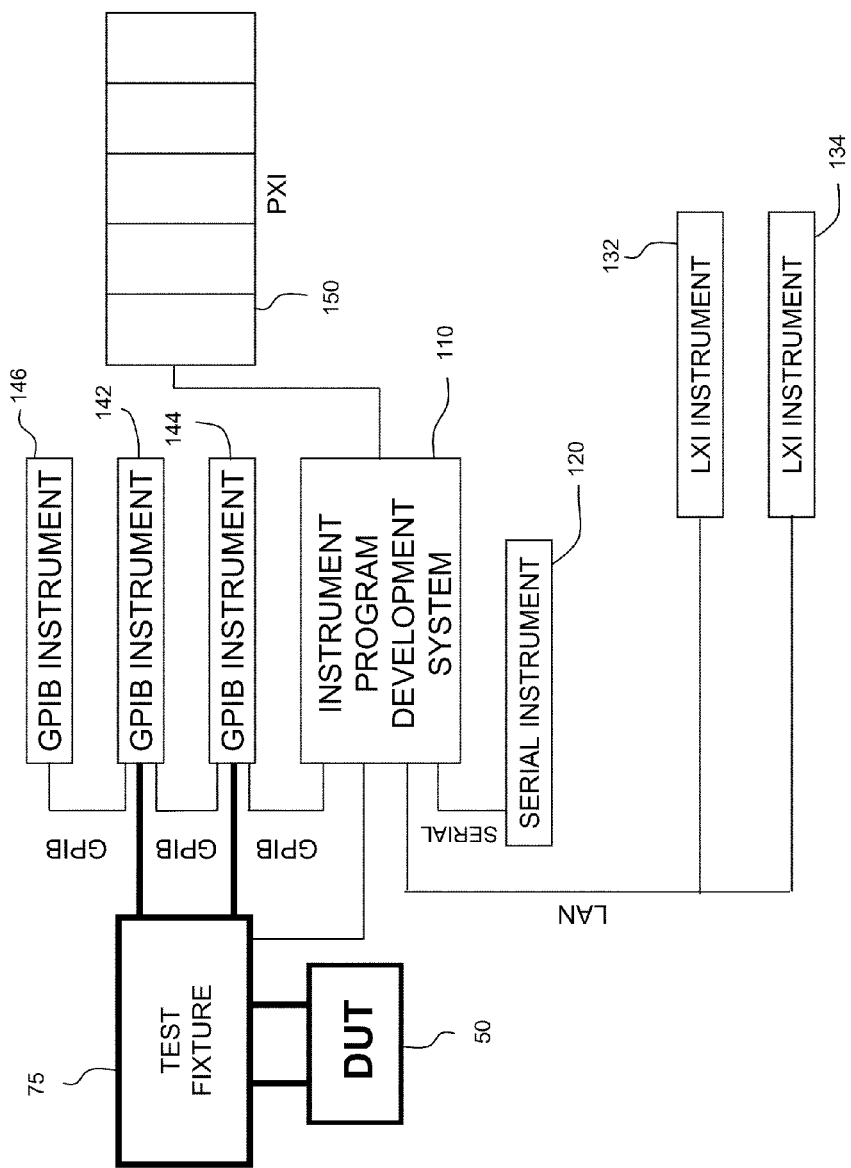
FIG. 1 illustrates an exemplary system of test instruments.

FIG. 1 illustrates an exemplary system 100 of test instruments.

System 100 includes an interactive instrument program development system 110 and a plurality of instruments connected to interactive instrument program development system 110 for testing a device under test 50 with a text fixture 75. Test instruments in system 100 include serial instrument 120, local area network (LAN) extension for instruments (LXI) instruments 132 and 134, general purpose instrument bus (GPIB) instruments 142, 144 and 146, and compact PCI bus for instrumentation (PXI) instrument 150, all connected to each other, to interactive instrument program development system 110, and/or to DUT 50 via test fixture 75 by corresponding, analog and digital connections. LXI instruments 132/134 are also connected to test workstation 110. Although not specifically illustrated in FIG. 1, other types of instruments may be included, for example, VERSAmodule Eurocard (VME) extensions for instrumentation (VXI) instruments.

Beneficially, instruments in system 100 may include one or more test instruments, including spectrum analyzer(s), power supply(ies), oscilloscope(s), frequency counter(s), signal generator(s), digital multi-meter(s), network analyzer(s), logic analyzer(s), and/or power meter(s), etc.

In a typical embodiment, a system which may operate with an interactive instrument program development system may include fewer different types of instruments and corresponding connections than are shown in FIG. 1. In one typical arrangement, only GPIB instruments may be present, or only LXI instruments may be present, or indeed, only a single instrument may be connected to the interactive instrument program development system. Accordingly, FIG. 1 should be understood as a generalized example, presented for illustrative purposes only, and not limiting in any way.

Figure 2:
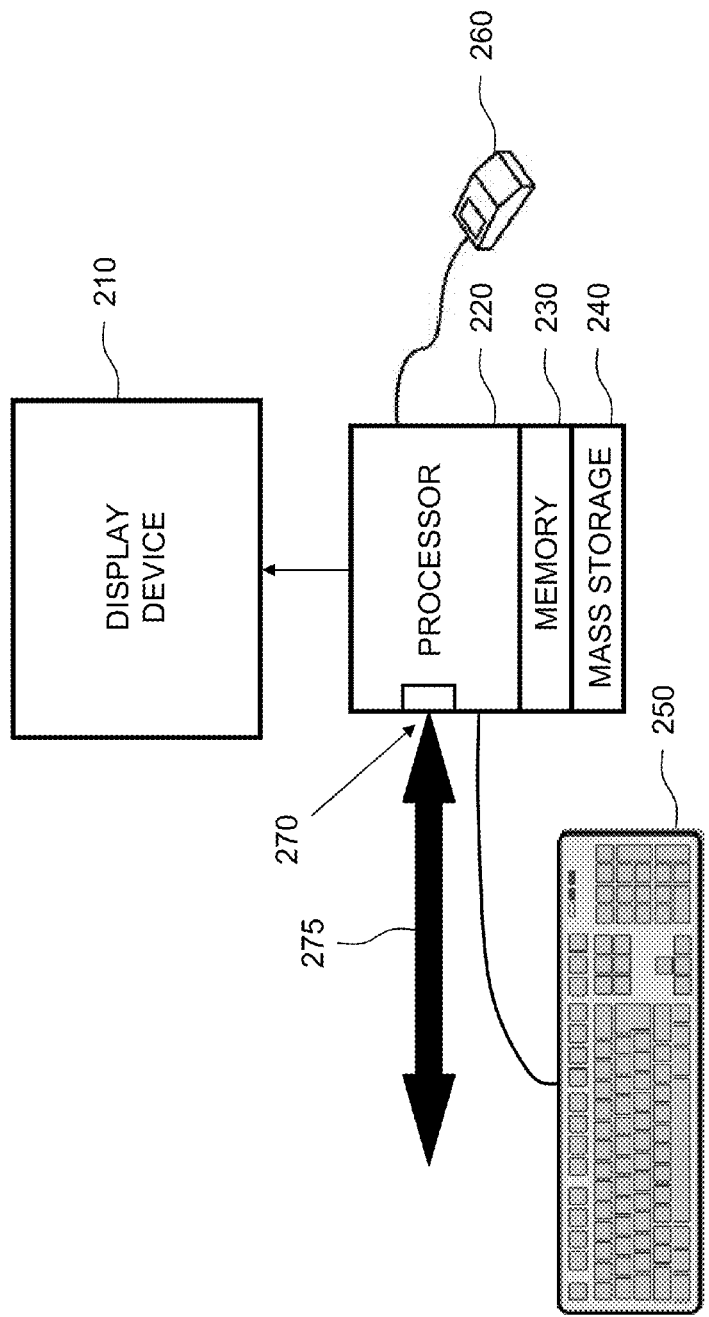
FIG. 2 illustrates an exemplary interactive instrument program development system.

FIG. 2 illustrates an exemplary interactive instrument program development system 200 which may be employed in the system 100 of FIG. 1. As will be appreciated by those skilled in the art, one or more of the various "parts" shown in FIG. 2 may be physically implemented using a software-controlled microprocessor, hard-wired logic circuits, or a combination thereof. Also, while the parts are functionally segregated in FIG. 2 for explanation purposes, they may be combined variously in any physical implementation.

Interactive instrument program development system 200 includes a display device 210, a processor 220, a memory device 230, mass data storage device 240, a first user input device 250, a second user input device 260, and a communication port 270.

Display device 210 may be any convenient type of device which can display information to a user of interactive instrument program development system 200.

Processor 220 is configured to execute one or more software algorithms in conjunction with memory 230 to provide functionality for interactive instrument program development system 200. Beneficially, processor 220 includes its own memory (e.g., nonvolatile memory) for storing executable software programming code that allows it to perform the various functions of interactive instrument program development system 200. Alternatively, or additionally, executable code may be stored in designated memory locations within memory 230.

Processor 220 may operate with one or more operating system, such as WINDOWS®, LINUX®, UNIX®, HP-UX®, MAC OS®, OPENVMS®, etc. Beneficially, in some embodiments processor 220 operates with an operating system that supports a graphical user interface (GUI), with features such as windows, buttons, check-boxes, data entry boxes, mouse cursors, etc. Processor 220 may also be configured to run an application that can receive, process and display information received in hyper-text markup language (HTML) format, and/or variants thereof including documents in an extensible mark-up language (XML) format.

Memory device 230 may include random access memory (RAM), read only memory (ROM), and/or flash memory, etc. Beneficially, memory device 230 stores data and/or software programming code used in operations of interactive instrument program development system 200.

Mass storage device 240 may include a hard disk drive, an optical drive, and/or a tape drive, etc. Beneficially, mass storage device 240 comprises a non-volatile storage medium. Mass storage device 240 may store an operating system and software programs utilized by interactive instrument program development system 200. In some embodiments, mass storage device 240 may store one or more instrument description files that describe commands to which various instruments respond, and/or other information regarding the operation of the instruments.

As shown in FIG. 2, first user input device 250 is a keyboard, and second user input device 260 is a mouse. However it should be understood that a variety of other user input devices may be provided in addition to, or instead of, the keyboard and/or mouse.

Communication port 270 communicates with one or more instruments in a system, such as system 100, via communication channel 275. Communication port 270 may be an IEEE-488 port, a serial port (e.g., a USB port), a Fire wire port, an Ethernet port, a wireless port, or any other convenient communication port for communicating with test instruments for which it is desired to develop test programs. It should be understood that although FIG. 2 shows only a single communication port 270 for simplicity of illustration, in general interactive instrument program development system 200 may include a plurality of communication ports of different types as described above.

In general, interactive instrument program development system 200 may be conceptualized as a computer that executes algorithms that provide a tool to let users operate one or more instruments remotely without requiring them to know each instrument's specific commands and command formats before-hand. In some embodiments, interactive instrument program development system 200 requests and receives an instrument description file for each instrument in a standard format (e.g., XML format) that allows a user to find the instrument's capabilities and documentation (e.g., by browsing or searching for keywords). In some embodiments, interactive instrument program development system 200 allows a user to operate the instrument(s) remotely, to obtain and set instrument properties and invoke instrument actions, to send commands to the instrument, and to observe the results produced by those commands. In some embodiments, interactive instrument program development system 200 allows users to obtain working measurements without worrying about the underlying details of programming the instrument(s). In some embodiments, interactive instrument program development system 200 allows users to fine tune a test program by adding, deleting, and rearranging commands until they are satisfied with the results they obtain. In some embodiments, interactive instrument program development system 200 allows users to automatically generate the code required to implement the final test program. In some embodiments, interactive instrument program development system 200 saves the commands which a user selects, and allows the user to adjust a test program by playing back and rearranging the order of the recorded commands. In some embodiments, interactive instrument program development system 200 allows a user to copy these commands into the programming language of his/her choice and paste them as working code.

Figure 3:
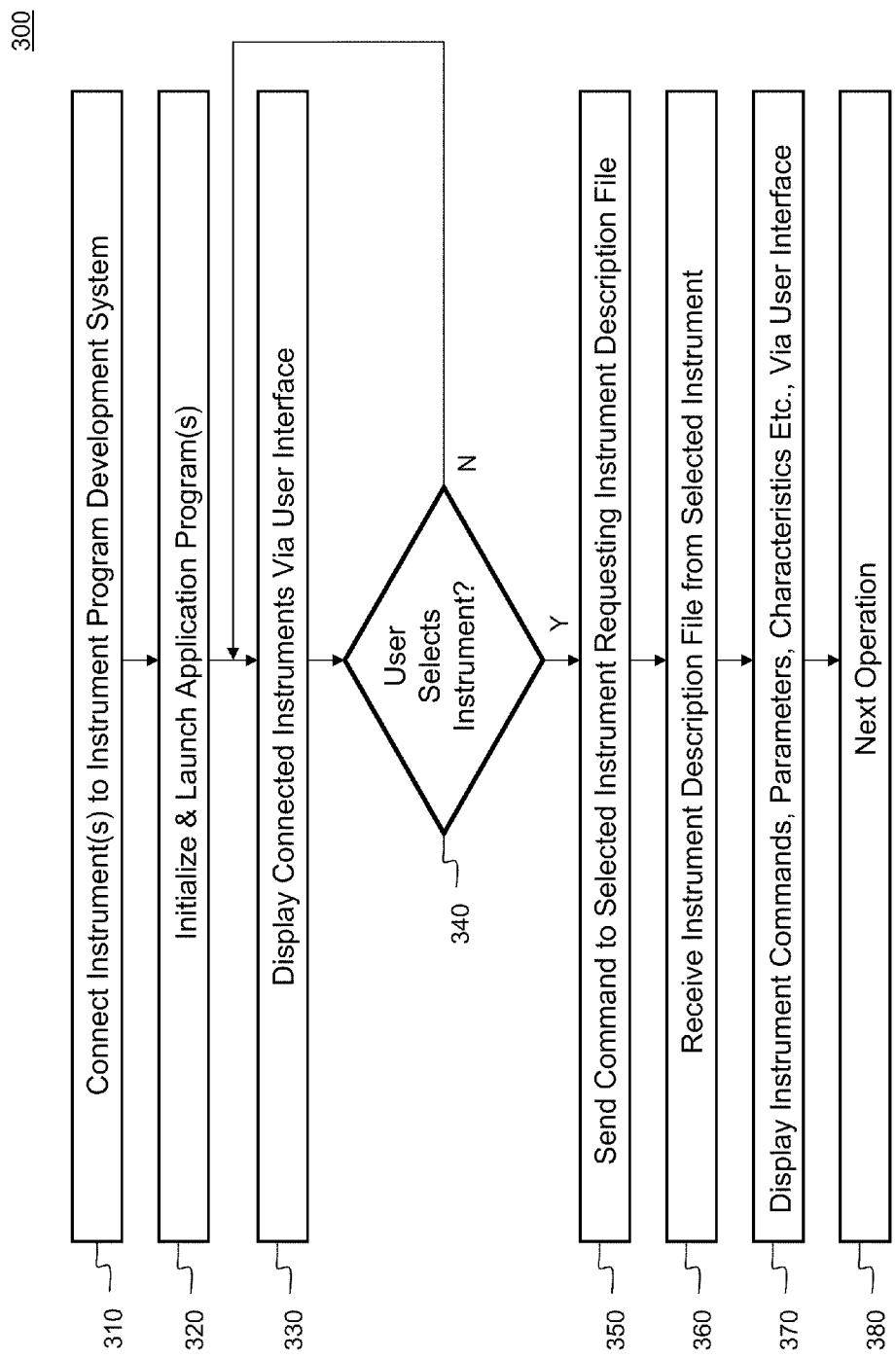
FIG. 3 shows a functional block diagram illustrating one embodiment of a method of facilitating interactive instrument program development.

FIG. 3 shows a functional block diagram illustrating one embodiment of a method 300 of facilitating interactive instrument program development that may be performed using interactive instrument program development system 200 with a system such as system 100 shown in FIG. 1.

In a step 310, one or more instruments are connected to instrument program development system 200 via one or more communication ports (e.g., communication port 270). The instrument(s) may be any of the type of instruments described above with respect to system 100 in FIG. 1.

In a step 320, a user initializes instrument program development system 200 (e.g., turns on the power, boots the operating system, etc.) and launches one or more application programs, including an application program for facilitating interactive test program development for a user employing the connected instruments.

In a step 330, interactive instrument program development system 200 displays via display device 210 an indication of one or more instruments that are connected to instrument program development system 200. In one embodiment, instrument program development system 200 may operate in a "plug-and-play" mode wherein it automatically discovers any new instruments that are connected to it. Alternatively, or additionally, an application of instrument program development system 200 provides a user with a way to instruct instrument program development system 200 to search for any attached instruments.

Instrument program development system 200 provides a user interface to a user via display device 210 and a user input device 250 and/or 260. The user interface displays one or more objects representing a corresponding one or more instruments that are connected to interactive instrument program development system 200. An example embodiment will be described below with respect to FIG. 4.

In a step 340, interactive instrument program development system 200 determines whether it has received from a user (e.g., via user input device(s) 250/260) a selection of one instrument(s) attached to instrument program development system 200.

If so, then in step 350 interactive instrument program development system 200 sends a standard command to the selected instrument to request an instrument description file describing commands to which the selected instrument responds, and in a step 360, interactive instrument program development system 200 receives the instrument description file from the selected instrument.

Beneficially, an instrument description file is stored into a nonvolatile memory of the corresponding instrument by a manufacturer. In some embodiments, the instrument description file for the instrument may be updated with changes as capabilities of the corresponding instrument are changed.

Beneficially, the instrument description file includes: all of the commands (e.g., SCPI commands) to which the instrument responds; details about each command such as parameters (e.g., inputs/outputs) associated with the command, command syntax, a description of the command, a description of the command's parameters, expected response(s) to the command, an example operation of the command, etc; and other information about the corresponding instrument.

Beneficially, the instrument description file is in a standard format that is expected and recognized by instrument program development system 200. In one embodiment, the instrument description file may be an XML file.

Beneficially, the standard command is communicated to the selected instrument via communication port 270 and a corresponding communication connection (e.g., a GPIB connection).

Beneficially, the standard command is a standard SCPI command that is recognized by a variety of instruments and in response to which an instrument is pre-programmed to supply its corresponding instrument description file which is stored in its memory.

In alternative arrangements, interactive instrument program development system 200 may obtain the instrument description file without requesting it directly from the instrument as described above with respect to steps 350 and 360. For example, in some embodiments instrument program development system 200 may obtain instrument description files from a remote source, such as a server connected to the Internet. In other embodiments, one or more instrument description files may be pre-stored on mass storage device 240—for example by a user via a compact disk or portable flash memory device that is associated with (and may be supplied by a vendor together with) the instrument. Other arrangements are possible.

Also, the order of steps described above may be rearranged in various ways. For example, in some embodiments instrument program development system 200 obtains the instrument description files from instruments automatically, as soon they are detected as being connected to instrument program development system 200, and before a user selects the instrument in step 340. Again, other arrangements are possible.

In a step 370, instrument program development system 200 presents to the user via the user interface (e.g., via display 210) an indication of the commands to which the selected instrument responds. As noted above, instrument program development system 200 determines the commands for a selected instrument from that instrument's instrument description file.

In a step 380, instrument program development system 200 proceeds to a next operation as indicated by user interactions via the user interface.

Figure 4:
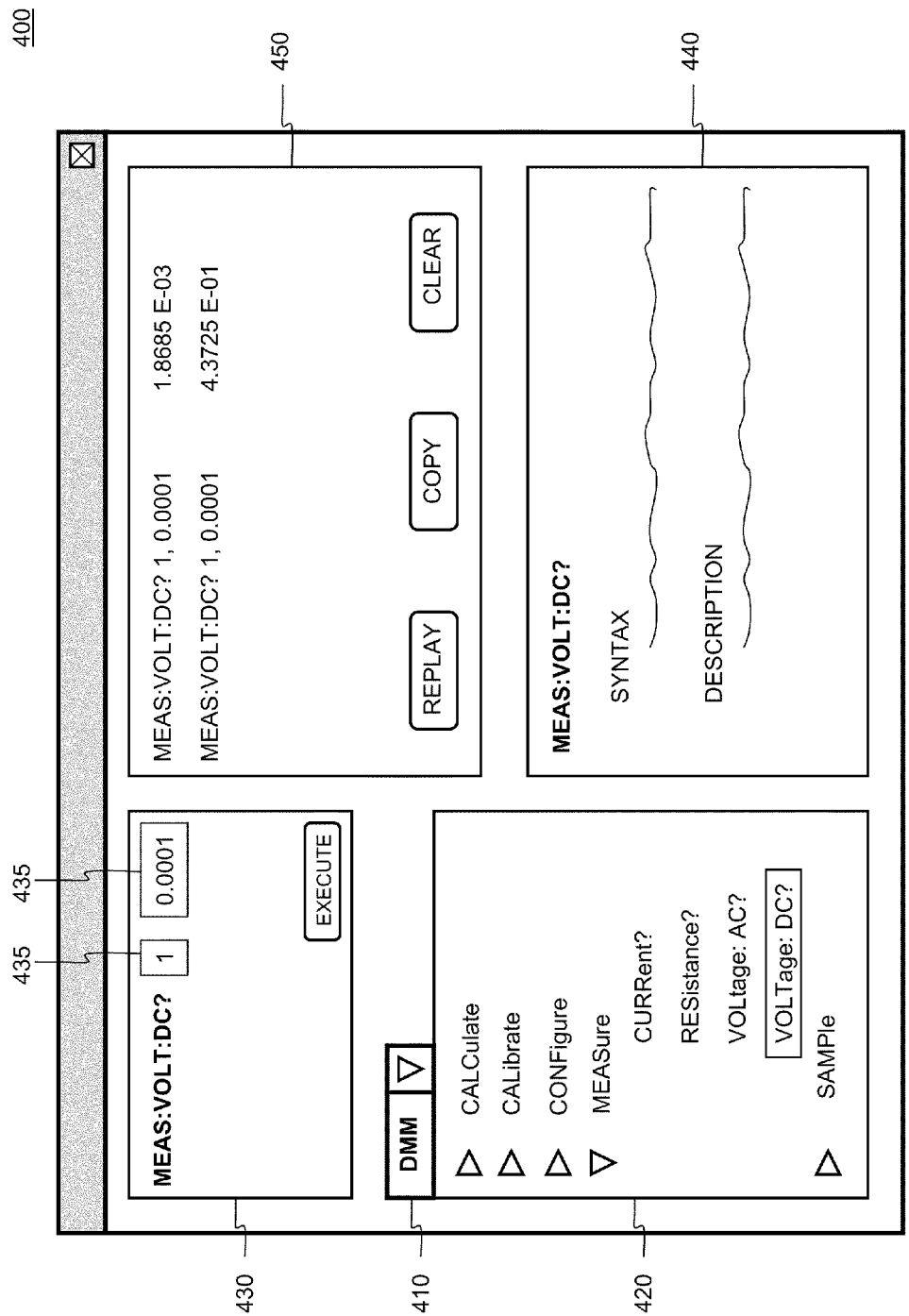
FIG. 4 illustrates a screen shot of an exemplary display of a user interface.

FIG. 4 illustrates a screen shot of an exemplary display screen 400 of a user interface by which instrument program development system 200 may present to a user: an indication of instruments connected to instrument program development system 200; commands and other information pertaining to a selected instrument; and other information described below. Display screen 400 includes: instrument display area 410; command display area 420; parameter entry area 430; command description area 440; and command list area 450. Of course, other areas are may be included, and other display screens may be included in the user interface. Furthermore, in another embodiment, a display screen may instead be comprised of a plurality of separate windows for each of the various areas. Other arrangements are possible.

In one embodiment, instrument display area 410 displays instruments to which instrument program development system 200 is connected. The instruments may be displayed as text, in a list, as icons, as pictures, as buttons, or in any other convenient way. A user may select an instrument connected to instrument program development system 200 by interacting with the instrument in instrument display area 410 (e.g., pointing a mouse cursor at the instrument's name or icon and clicking or double-clicking, etc.).

In one embodiment, command display area 420 displays a list of commands (e.g., SCPI commands) which pertain to a selected instrument. The commands may be displayed as text, in a list (including a hierarchical list as shown in FIG. 4), as icons, as pictures, as buttons, in a pull-down menu, or in any other convenient way. A user may select a command for a selected instrument by interacting with the command in command display area 420 (e.g., pointing a mouse cursor at the command and clicking or double-clicking, etc.). Beneficially, instrument program development system 200 obtains the commands for the selected instrument from its instrument description file, as explained above with respect to FIG. 3.

In one embodiment, parameter entry area 430 displays parameters (e.g., inputs and outputs) associated with a selected command for a selected instrument. Beneficially, parameter entry area 430 includes one or more parameter entry boxes 435 to allow a user to enter desired parameters for a command to be sent to the selected instrument. Although for illustration purposes, display screen 400 and the description to follow specifically describe parameter entry boxes 435, it should be understood that the features described herein could be provided through alternative means for a user to indicate desired parameter values via the user interface of instrument program development system 200.

Beneficially the number and type of parameter entry boxes 435 displayed to a user in parameter entry area 430 will change depending upon the command and/or instrument selected by the user. Beneficially, parameter entry boxes 435 displayed to the user are created and displayed for each parameter of a selected command according to the correct syntax or format for that parameter. Beneficially, instrument program development system 200 determines the appropriate formats for the parameter entry boxes 435 to be displayed to a user for a selected command by referring to information in the information description file obtained for the selected instrument, as described above with respect to FIG. 3.

In one embodiment, one or more commands for an instrument may have more than one acceptable command format or syntax, with each command format having a different set of corresponding parameters. In that case, beneficially, parameter entry area 430 allows a user to select which command format the user wishes to employ, and the corresponding parameter entry boxes 435 are displayed to the user.

In one embodiment, when a user enters a parameter value in a parameter entry box 435, instrument program development system 200 checks that the parameter value is in the proper format and/or within then allowed range of values, and if not, then instrument program development system 200 provides an error message or other feedback informing the user that the parameter value that the user supplied is not allowed. For example, consider a case where a particular parameter for a selected command must be a numerical value in a range of −10 to +10. In that case, if a user attempts to incorrectly supply a character string such as "ten" in the corresponding parameter entry box 435, then instrument program development system 200 provides an error message or other feedback informing the user that the parameter value is improper and perhaps also informing the user of the reason(s) why. Beneficially, instrument program development system 200 will not send the selected command to the selected instrument until the invalid parameter value is corrected by the user.

In one embodiment, instrument program development system 200 provides information in parameter entry area 430 regarding the proper format and/or allowed range of values for a parameter which can be entered into each parameter entry box 435. Beneficially, this information can be provided through a user right-clicking a mouse, or a pop up window that appears when the user starts typing into a parameter entry box 435, or in any other convenient way.

Beneficially, parameter entry area 430 includes a clickable button or other control that allows a user to instruct instrument program development system 200 to send the command (e.g., a SCPI command) to the selected instrument.

In one embodiment, command description area 440 displays information pertaining to a selected command for a selected instrument. Such information may include: command syntax, a description of the command; a description of the command's parameters; user comments; expected response(s) to the command; an example operation of the command; etc. Beneficially, instrument program development system 200 obtains the information presented in command description area 440 from the instrument's instrument description file, as described above with respect to FIG. 3.

In one embodiment, command list area 450 displays a command list that includes the commands (e.g., SCPI commands) that the user has instructed instrument program development system 200 to send to one or more selected instruments, and associated results received back from the instrument(s). Beneficially, command list area 450 includes various controls or buttons that allow a user to reorder, rearrange, delete, and add commands for the command list. Beneficially, command list area 450 includes a control or button that allows a user to play back a command list and observe the results generated by the instrument(s). Beneficially, command list area 450 includes various controls or buttons that allow a user to save the command list to data storage (e.g., memory device 230 and/or mass storage device 240). Beneficially, command list area 450 includes controls or buttons that allow a user to automatically generate the code required to implement a measurement procedure described by the command sequence in the command list, and/or to allow the user to copy the commands in the command list into a programming language of his/her choice and paste them as working code.

Figure 5:
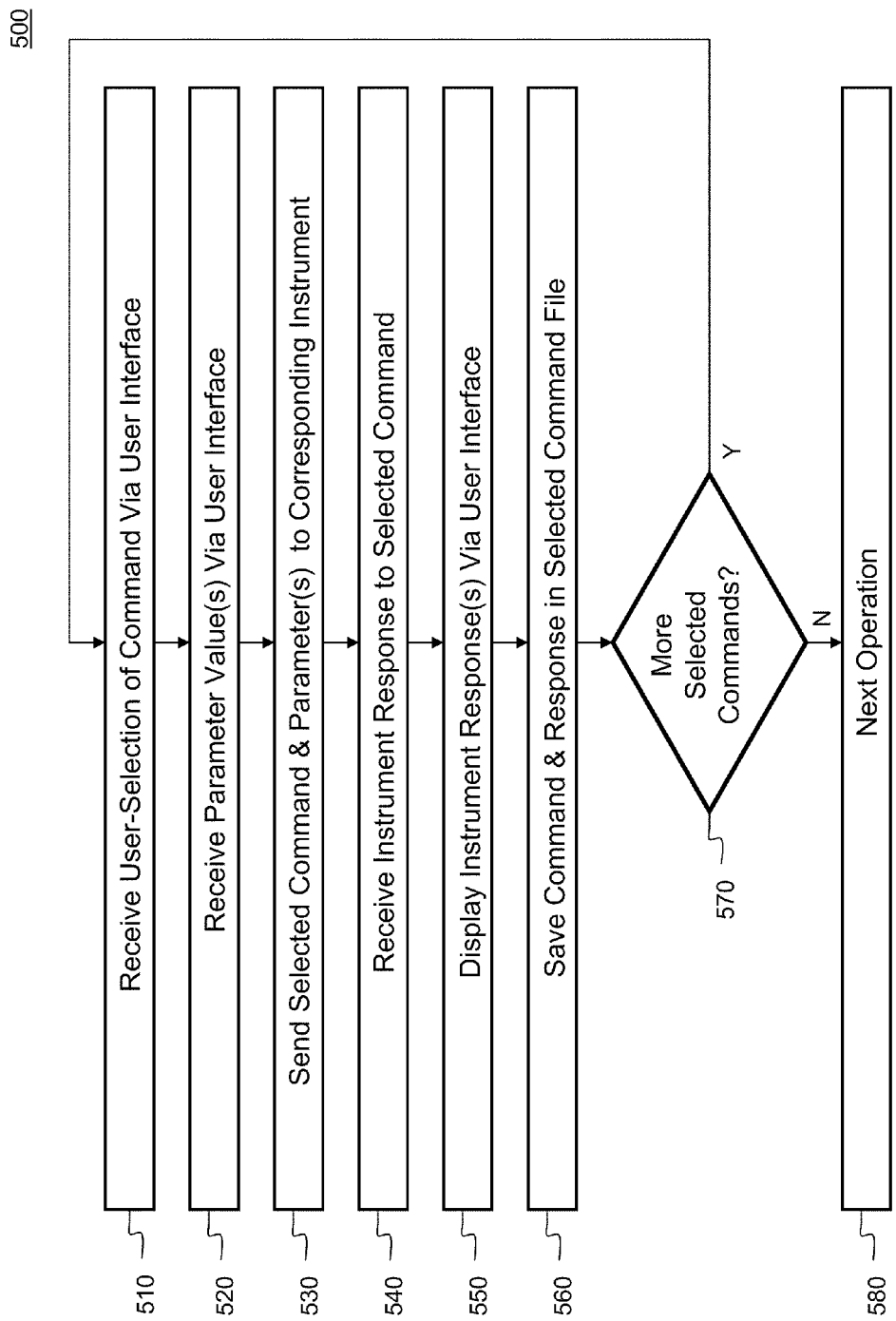
FIG. 5 shows a functional block diagram illustrating another embodiment of a method of facilitating interactive instrument program development.

FIG. 5 shows a functional block diagram illustrating another embodiment of a method 500 of facilitating interactive instrument program development that may be performed using interactive instrument program development system 200 and a system such as system 100 shown in FIG. 1.

In a step 510, instrument program development system 200 receives from a user via the user interface (e.g., via user input device(s) 250/260 and display screen 400) a selection of a command (e.g., a SCPI command) for a selected instrument that the user wants to send to the selected instrument. In one embodiment, instrument program development system 200 may obtain and display the commands by a method 300 as described above with respect to FIG. 3.

In step 520, instrument program development system 200 receives user-selected parameter values for the selected command. As noted above with respect to FIG. 4, in one embodiment instrument program development system 200 determines the parameters pertaining to a selected command for a selected instrument by reference to the information description file that was obtained for that instrument, and supplies appropriate parameter entry boxes for a user to supply the user-selected parameter values. In some cases, a command may not require any user-supplied parameter values, in which case step 520 can be skipped.

In a step 530, instrument program development system 200 sends the selected command to the selected instrument to instruct the selected instrument to perform a corresponding operation. As noted above with respect to FIG. 4, in some embodiments instrument program development system 200 checks the validity of user-supplied parameter values, informs the user of any errors, and only sends the selected command to the selected instrument once it verifies that the user-supplied parameter values are valid for the selected command and the selected instrument.

In a step 540, instrument program development system 200 receives a response generated by the selected instrument in response to the selected command.

In a step 550, instrument program development system 200 displays to the user via the user interface (e.g., via display device 210) an indication of the response to the selected command.

In a step 560, instrument program development system 200 saves the command (e.g., a SCPI command) and its associated response in a command list in a selected command file in data storage (e.g., memory device 230). The selected command file may be given a unique name by a user for a test program that the user is developing, and may be stored in mass storage device 240 in response to a user instruction. Beneficially, as a user repeats steps 510-560, additional commands are added to the command list in the selected command file.

In a step 570, instrument program development system 200 determines whether the user is selecting another command, in which case the process returns to step 510. Otherwise, in a step 580 instrument program development system 200 proceeds to a next operation as indicated by user interactions via the under interface.

Figure 6:
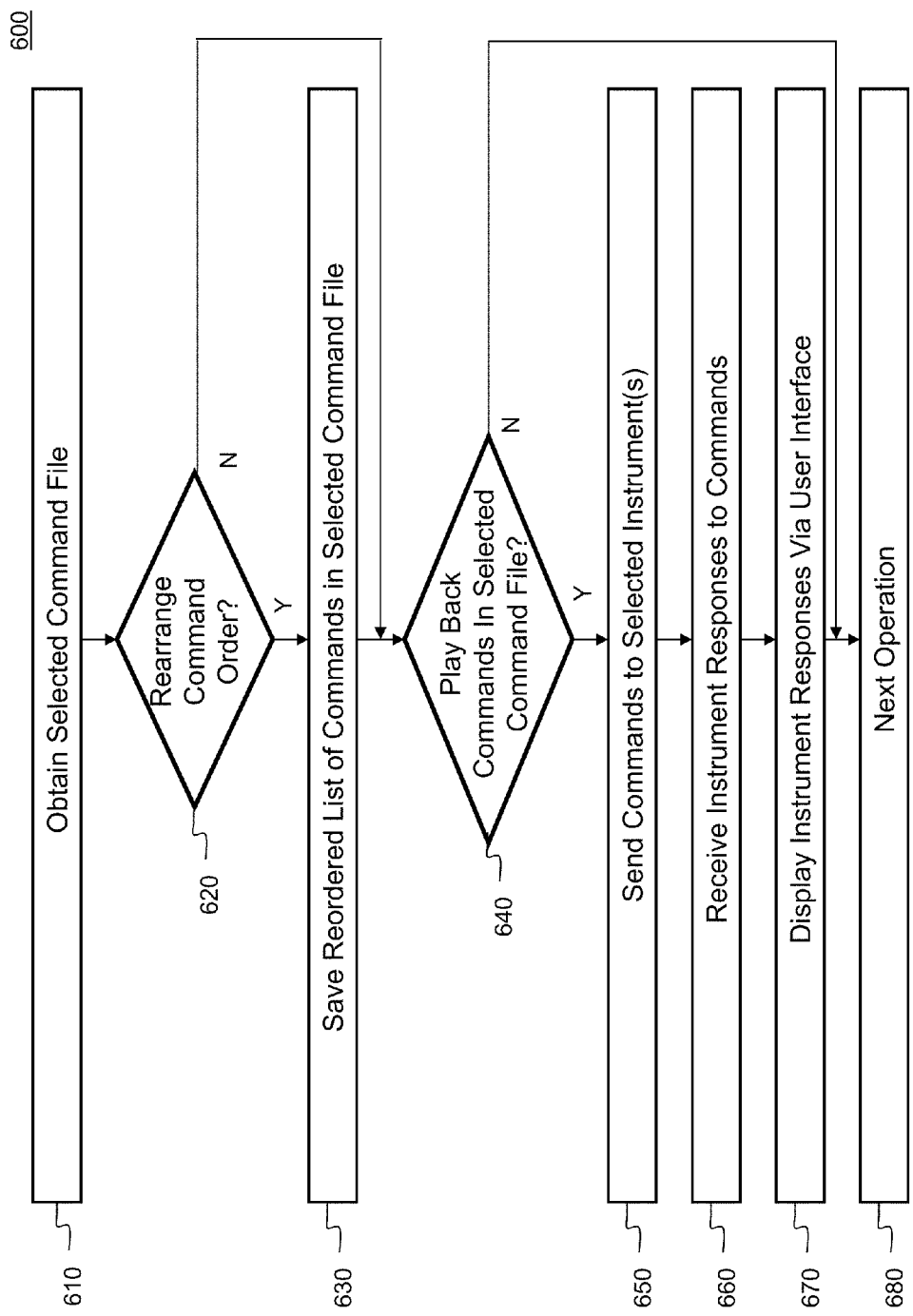
FIG. 6 shows a functional block diagram illustrating another embodiment of a method of facilitating interactive instrument program development.

FIG. 6 shows a functional block diagram illustrating another embodiment of a method 600 of facilitating interactive instrument program development.

In a step 610, instrument program development system 200 obtains a selected command file. In one embodiment, the selected command file may be obtained by a method 500 as described above with respect to FIG. 5. Alternatively or additionally, instrument program development system 200 may retrieve a previously-created selected command file from mass storage device 240.

In a step 620, instrument program development system 200 determines whether a user instruction is received via the user interface (e.g., via user input device(s) 250/260) indicating that a user wants to rearrange an order of commands in the command list in the selected command file. If so, then the process proceeds to step 630. Otherwise, the process goes to step 640.

In a step 630, in response to a user instruction received via the user interface (e.g., via user input device(s) 250/260), instrument program development system 200 reorders or rearranges the commands (e.g., SCPI commands) in the command list in the selected command file and saves the reordered command list in data storage (e.g., memory device 230 and/or mass storage device 240).

In a step 640, instrument program development system 200 determines whether a user instruction is received via the user interface (e.g., via user input device(s) 250/260) indicating that a user wants to play back the commands in the command list of the selected command file. If so, then the process proceeds to step 650. Otherwise, the process goes to step 680.

In a step 650, instrument program development system 200 sends the series of commands (e.g., SCPI commands) in the command list to the corresponding instrument or instruments connected to instrument program development system 200.

In a step 660, instrument program development system 200 receives responses generated by the selected instruments in response to the selected commands that it sends to the instruments.

In a step 670, instrument program development system 200 displays to the user via the user interface (e.g., via display device 210) indications of the responses to the selected commands.

In a step 680, instrument program development system 200 proceeds to a next operation as indicated by user interactions via the under interface. For example, the next operation may include automatically generating the code required to implement a measurement procedure described by the command sequence in the command list. In another example, the next operation may be an operation of copying the commands in the command list into a programming language of a user's choice and pasting the commands in as working code. Other operations are possible.

While example embodiments are disclosed herein, one of ordinary skill in the art appreciates that many variations that are in accordance with the present teachings are possible and remain within the scope of the appended claims. The invention therefore is not to be restricted except within the scope of the appended claims.

The invention claimed is:

1. A method, comprising:
providing a user interface to a user via a display device and a user input device associated with a computer, the user interface displaying one or more objects representing a corresponding one or more instruments that are connected to the computer;
receiving from a user a selection of one of the one or more instruments, the selection being made via the user interface;
obtaining at the computer a file that describes commands to which the selected instrument responds; and
presenting to the user via the user interface an indication of the commands to which the selected instrument responds;
receiving from the user a selection of one of the commands via the user interface;
sending the selected command from the computer to the selected instrument to instruct the selected instrument to perform some operation;
receiving a response generated by the selected instrument in response to the selected command; and
displaying to the user via the user interface an indication of the response to the selected command.

2. The method of claim 1, wherein obtaining at the computer a file that describes commands to which the selected instrument responds comprises:
sending a standard command from the computer to the selected instrument to request the file describing commands to which the selected instrument responds;
receiving at the computer from the selected instrument the file that describes the commands to which the selected instrument responds.

3. The method of claim 1, wherein obtaining at the computer a file that describes commands to which the selected instrument responds comprises retrieving the file from a mass storage system.

4. The method of claim 1, wherein the file is in an extended markup language (XML) format, and wherein the file describes Standard Commands for Programmable Instrumentation (SCPI) commands to which the selected instrument responds.

5. The method of claim 1, wherein receiving from the user a selection of one of the commands via the user interface includes:
displaying to the user via the user interface a description of the selected command and at least one field for entering a parameter value for a parameter of the selected command; and
receiving from the user via the user interface the parameter value for the at least one parameter of the selected command.

6. The method of claim 5, wherein the at least one field for entering the parameter value for the parameter of the selected command is determined from parameter information for the selected command that is included in the file that describes the commands to which the selected instrument responds.

7. The method of claim 5, further comprising checking a validity of the parameter value received from the user against validity rules for the parameter that are included in the file that describes the commands to which the selected instrument responds, and informing the user of an error when the parameter value received from the user is determined to be invalid.

8. The method of claim 1, further comprising:
receiving from the user via the user interface a series of selections of the commands;
sending the selected commands from the computer to the selected instrument to instruct the selected instrument to perform some operations;
receiving one or more responses generated by the selected instrument in response to the selected commands;
displaying to the user via the user interface an indication of the one or more responses to the selected command; and
saving a list of the selected commands in a selected command file at the computer.

9. The method of claim 1, wherein at least two instruments are connected to the computer, the method further comprising:
receiving from the user a selection of a second one of the one or more instruments, made via the user interface;
sending the standard command from the computer to the second selected instrument to request a second file describing commands to which the second selected instrument responds;
receiving at the computer from the second selected instrument the second file that describes the commands to which the second selected instrument responds; and
presenting to the user via the user interface an indication of the commands to which the second selected instrument responds.

10. The method of claim 9, further comprising:
receiving from the user via the user interface a series of selections of the commands, including at least one command corresponding to the first selected instrument and at least one command corresponding to the second selected instrument;
sending each of the selected commands from the computer to the corresponding selected instrument to instruct the corresponding selected instrument to perform some operation;
receiving responses generated by the selected instruments in response to the selected commands;
displaying to the user via the user interface an indication of the responses to the selected commands; and
saving a list of the selected commands in a selected command file at the computer.

11. A system, comprising:
a display device;
a user input device;

a communication port; and a processor configured to execute an algorithm comprising:

displaying on the display device indications of one or more Objects representing one or more corresponding instruments that are connected to the system via the communication port;

receiving from the user input device a user-selection of one of the one or more instruments;

obtaining at the system a file that describes commands to which the selected instrument responds;

displaying on the display device an indication of the commands to which the selected instrument responds;

receiving from the user input device a user selection of one of the commands;

sending the selected command via the communication port to the selected instrument to instruct the selected instrument to perform some operation;

receiving at the communication port front the selected instrument a response generated by the selected instrument in response to the selected command; and displaying on the display device an indication of the response to the selected command.

12. The system of claim 11, wherein the system further includes a memory device, and wherein algorithm is embodied in processor-executable instructions stored in the memory device.

13. The system of claim 11, wherein receiving from the user a selection of one of the commands via the user interface includes:

displaying on the display device a description of the selected command and at least one field for entering a parameter value for a parameter of the selected command; and receiving from the user input device the parameter value for the parameter of the selected command.

14. The system of claim 13, wherein the at least one field for entering the parameter value for the parameter of the selected command is determined from parameter information for the selected command that is included in the file that describes the commands to which the selected instrument responds.

15. The system of claim 13, wherein receiving from the user a selection of one of the commands via the user interface includes checking a validity of the parameter value received from the user against validity rules for the parameter that are included in the file that describes the commands to which the selected instrument responds, and informing the user of an error when the parameter value received from the user is determined to be invalid.

16. The system of claim 11, wherein the system further includes a memory device, and wherein the algorithm further comprises:

receiving from the user input device a series of user-selections of the commands;

sending the selected commands via the communication port to the selected instrument to instruct the selected instrument to perform some operations;

receiving at the communication port from the selected instrument one or more responses generated by the selected instrument in response to the selected commands;

displaying via the display device an indication of the one or more responses to the selected command; and saving a list of the selected commands in a selected command file in the memory device.

17. The system of claim 11, wherein at least two instruments are connected to the system, and wherein the algorithm further comprises:

receiving from the user input device a selection of a second one of the one or more instruments, made via the user input device;

sending the standard command via the communication port to the second selected instrument to request a second file describing commands to which the second selected instrument responds;

receiving at the communication port from the second selected instrument the second file that describes the commands to which the second selected instrument responds; and displaying on the display device an indication of the commands to which the second selected instrument responds.

18. The system of claim 17, wherein the system further includes a memory device, and wherein the algorithm further comprises:

receiving from the user input device a series of selections of the commands, including at least one command corresponding to the first selected instrument and at least one command corresponding to the second selected instrument;

sending each of the selected commands via the communication port to the corresponding selected instrument to instruct the corresponding selected instrument to perform some operation;

receiving at the communication port from the selected instrument responses generated by the selected instruments in response to the selected commands;

displaying on the display device an indication of the responses to the selected commands; and saving a list of the selected commands in a selected command file in the memory device.

* * * * *